United States Patent [19]

Papuchon et al.

[11] Patent Number: 4,482,248
[45] Date of Patent: Nov. 13, 1984

[54] INTERFEROMETER WITH A TUNABLE OPTICAL RESONATOR INCORPORATING A MONOMODE OPTICAL FIBRE AND APPLICATION TO FILTERING AND SPECTOGRAPHY

[75] Inventors: Michel Papuchon; Claude Puech; Hervé Arditty, all of Paris, France

[73] Assignee: Thomson-CSF, Paris, France

[21] Appl. No.: 467,456

[22] Filed: Feb. 17, 1983

Related U.S. Application Data

[63] Continuation of Ser. No. 228,686, Jan. 26, 1981, abandoned.

[30] Foreign Application Priority Data

Jan. 29, 1980 [FR] France ................. 80 01892

[51] Int. Cl.³ .............................................. G01B 9/02
[52] U.S. Cl. .................................. 356/346; 250/227; 250/231 R; 356/352
[58] Field of Search ............... 356/346, 350, 352; 350/96.29, 96.19; 250/227, 231 R; 372/6, 20; 310/369

[56] References Cited

U.S. PATENT DOCUMENTS

| | | | |
|---|---|---|---|
| 3,308,394 | 3/1967 | Snitzer et al. | 350/96.29 X |
| 3,355,674 | 11/1967 | Hardy | 350/96.29 X |
| 3,772,611 | 11/1973 | Smith | 350/96.19 X |
| 3,984,190 | 10/1976 | Barrett et al. | 356/346 |
| 4,162,397 | 7/1979 | Bucaro et al. | 350/96.29 X |
| 4,225,236 | 9/1980 | Sandercock | 356/346 |
| 4,235,113 | 11/1980 | Carome | 350/96.29 X |
| 4,255,018 | 3/1981 | Ulrich et al. | 350/96.29 X |
| 4,299,490 | 11/1981 | Cahill et al. | 356/350 |
| 4,319,186 | 3/1982 | Kingsley | 350/96.29 X |

OTHER PUBLICATIONS

Neumann, "Inhomogeneities in Monomode Optical Waveguides" *Nouv. Rev. Optique*, vol. 6, No. 5, pp. 263-271, 1975.

Danielson, "Optical Fiber Phase Discriminator", *Applied Optics*, vol. 17, No. 22, pp. 3665-3668, Nov. 1978.

Hocker, "Fiber-Optic Sensing of Pressure and Temperature," Applied Optics, vol. 18, No. 9, pp. 1445-1448, May 1979.

Nethercot, Jr., "Light Modulator", *IBM Tech. Disclos. Bull.*, vol. 6, No. 7, pp. 55-56, Dec. 1963.

Hill et al., "Photosensitivity in Optical Fiber Waveguides: Application to Reflection Filter Fabrication", *Appl. Phys. Lett.*, vol. 32, No. 10, pp. 647-649, May 1978.

Applied Optics, vol. 18, No. 9, May 1979, G. B. Hocker, "Fiber-Optic Sensing of Pressure and Temperature".

*Primary Examiner*—Davis L. Willis
*Assistant Examiner*—Matthew W. Koren
*Attorney, Agent, or Firm*—Oblon, Fisher, Spivak, McClelland & Maier

[57] ABSTRACT

An interferometer having a tunable optical resonator using a monomode optical fiber as the light propagation medium. According to a preferred embodiment the fiber (1) is wound around a cylindrical mandrel (7) made from a piezoelectric ceramic material. Multiple reflections are ensured by reflecting deposits at the fiber ends. Rapid scanning of several orders of interference can be obtained by applying an alternating voltage V to the ceramic material.

6 Claims, 5 Drawing Figures

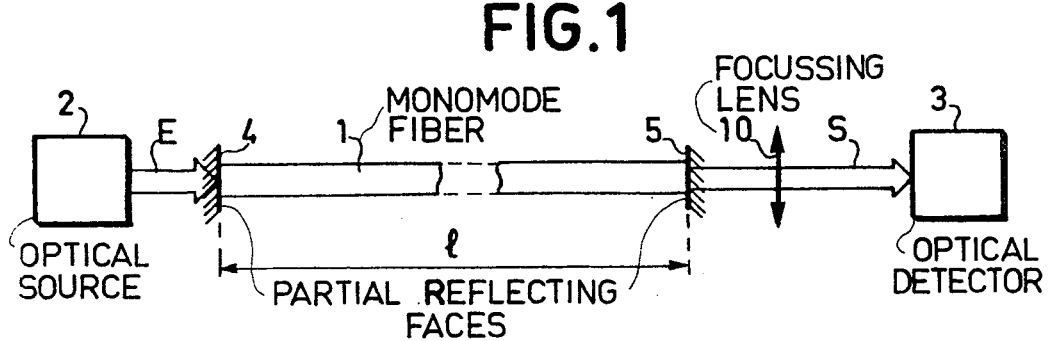
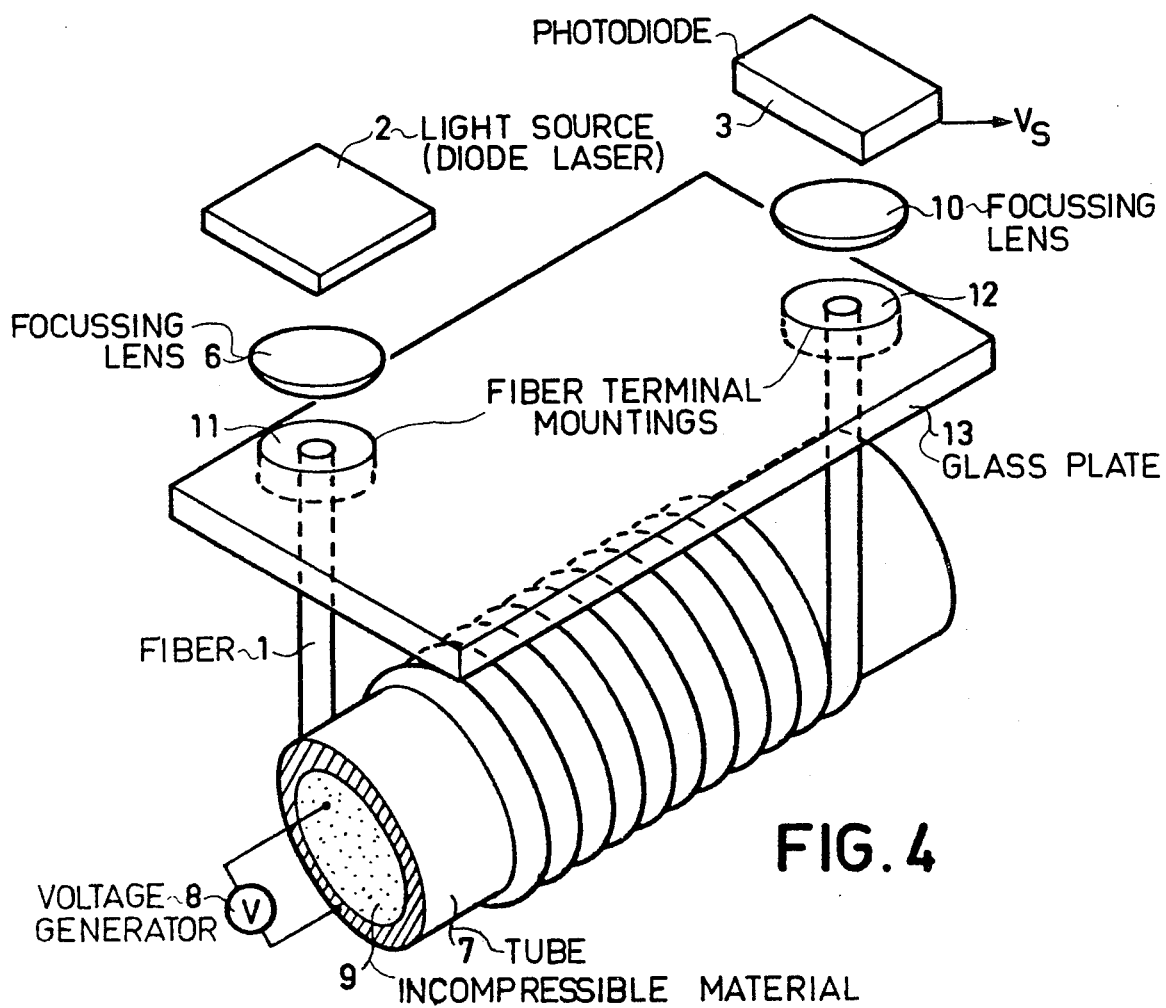

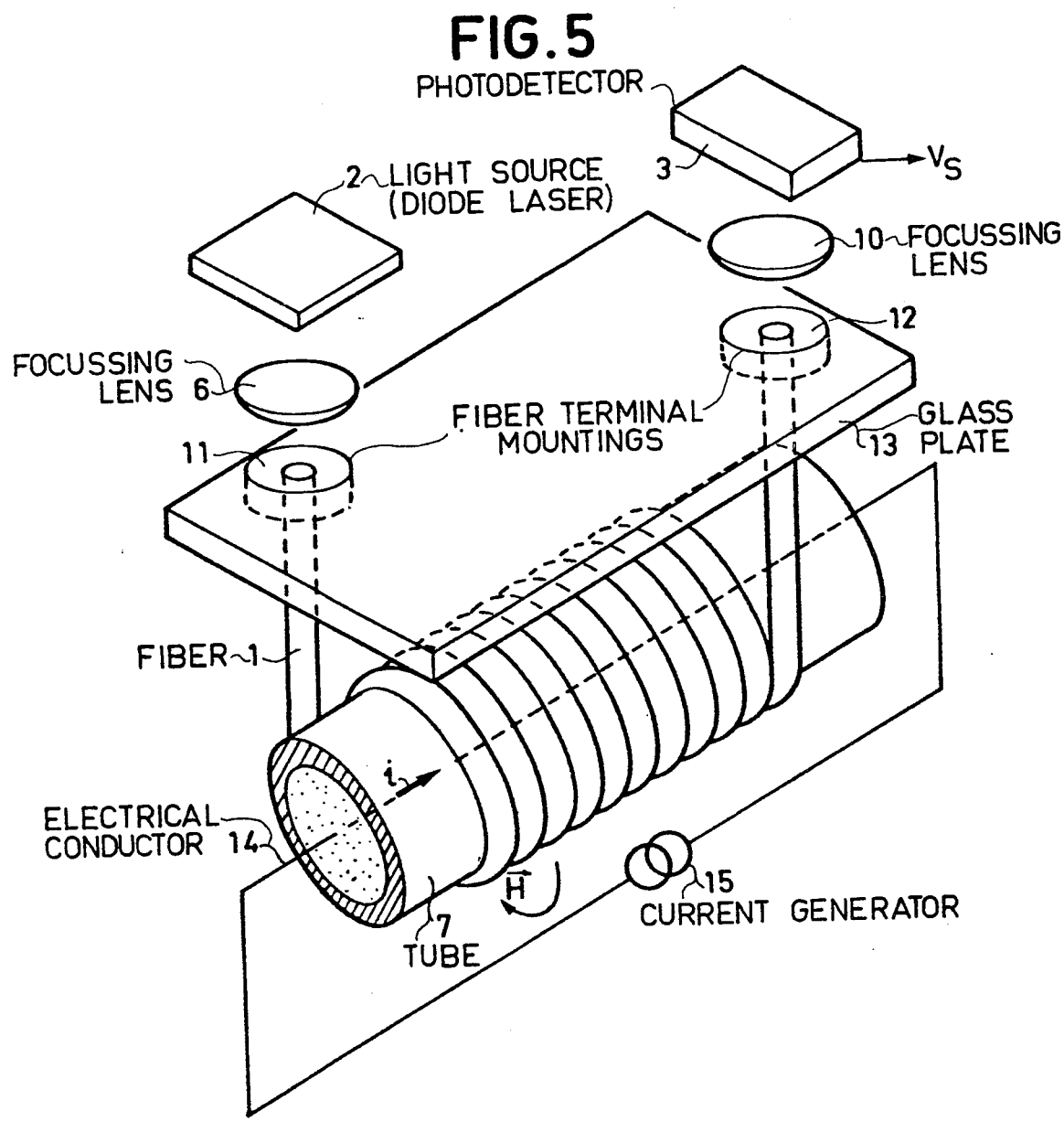

INTERFEROMETER WITH A TUNABLE OPTICAL RESONATOR INCORPORATING A MONOMODE OPTICAL FIBRE AND APPLICATION TO FILTERING AND SPECTOGRAPHY

This is a continuation of application Ser. No. 228,686, filed Jan. 26, 1981, now abandoned.

BACKGROUND OF THE INVENTION

The present invention relates to a Fabry-Pérot interferometer, which can more particularly be used for spectrography or optical filtering.

A conventional Fabry-Pérot interferometer comprises two parallel semi-transparent plates with a high reflection coefficient between which is formed an air gap having a strictly controlled thickness. An incident light ray supplies a series of emergent rays which interfere at infinity or in the focal plane of a lens. The interference fringes are bright rings on a dark background. In particular the centre is bright for a series of values of the ratio between the plate thickness and the wave length. By varying the thickness, e.g. by means of springs on which an action is exerted by screws, it is possible to modify at random the interference conditions.

This type of interferometer requires very fine settings, particularly with regard to the semi-transparent plates and the thickness adjustment. Technological considerations due to the mechanical regulating means conventionally used and problems concerning the overall dimensions limit the thickness of the air gap and consequently the wavelength resolution. Moreover, the thickness cannot be varied very rapidly.

BRIEF SUMMARY OF THE INVENTION

The invention relates to a Fabry-Pérot interferometer having a more simple construction and use and which does not require setting. According to the invention instead of propagating in air the light is guided in a monomode optical fiber. As existing technology makes it possible to produce monomode optical fibres with very small line losses, it is possible to have a very considerable length, if necessary (which can be up to several kilometers) without the losses introduced reducing the fineness of the interferometer line. Different means are provided for replacing the semi-transparent plates of a conventional interferometer involving the deposition of reflecting layers at the ends of the fiber and the creation of gaps in the vicinity of the ends. There is no alignment problem. To obtain scanning, the optical path taken by the light in the fiber is modified by using physical parameters such as mechanical stress, variation in the index by elasto-optical, magneto-optical, electro-optical and similar effects, thermal expansion, etc. The resonator can be tuned very rapidly. According to one of the embodiments of the invention the fiber is wound around a cylindrical mandrel, so that the overall dimensions can be very small.

Thus, the present invention relates to an interferometer with a tunable optical resonator comprising two reflectors defining said optical resonator and means making it possible to vary the optical path between the two reflectors, wherein the resonator is constituted by a monomode optical fiber.

BRIEF DESCRIPTION OF THE DRAWINGS

The invention is described in greater detail hereinafter relative to non-limitative embodiments and with reference to the attached drawings, wherein show:

FIG. 1: a general diagram of an interferometer according to the invention.

FIG. 4: an embodiment of the invention.

FIG. 5: another embodiment of the invention.

DETAILED DESCRIPTION OF THE PREFERRED EMBODIMENTS

Figure 2:
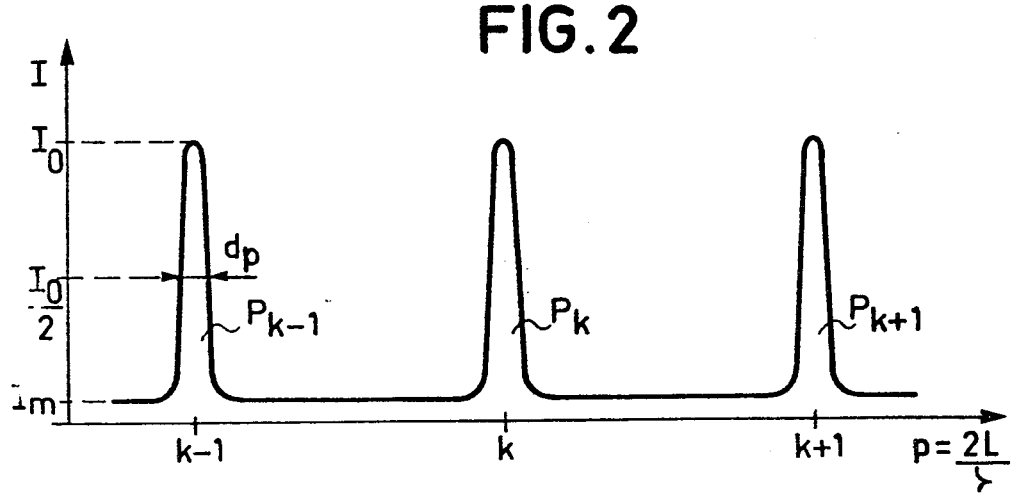
FIGS. 2 and 3: diagrams explaining the operation of the invention.

FIG. 1 is a general diagram of an interferometer according to the invention. Optical radiation E from a source 2 is introduced into a monomode optical fibre 1. Reflectors 4 and 5 are created either at the ends of the fiber, in the manner diagrammatically shown, or in the vicinity of said ends. The optical radiation propagating in the fiber consequently undergoes multiple reflections between the two reflectors. The superimposition of the waves transmitted by reflector 5 forms a radiation S, which is optionally focused by focusing lens 10 and collected by a photodetector 3 centred on the axes of lens 10 and fiber 1, said axes coinciding. As the ends of fiber 1 are polished to form planar surfaces perpendicular to the axis of the fiber and as the latter is of the monomode type, the fraction of the radiation reflected by each reflector necessarily respects the guidance conditions in the fiber and can therefore be propagated to the other end. Each reflector can be characterized by its reflection coefficient R and its absorption coefficient A, so that the transmission coefficient T is equal to $1-R-A$. In the same way as for a conventional Fabry-Pérot interferometer the radiation S results from the superimposition of waves which interfere with one another. The phase displacement between two successive waves of the same direction, i.e. following an outward and return travel in the fibre between two reflectors is equal to $2\beta l$ in which $\beta$ is the propagation constant and $l$ the length of the fibre between two reflectors. The latter is dependent on the wavelength, so that as k is the propagation constant in vacuum it is possible for each wavelength $\lambda$ to define the effective index of the fiber: $n=\beta/k$, which is close to the refractive index and the optical path $L=n \times l$. Photodetector 3 detects intensity peaks when the order of interference at the centre: $p=2L/\lambda$ is an integer, which means that the interferences are constructive, i.e. the phase displacement is a multiple of $2\pi$.

The main results given hereinafter are common to all Fabry-Pérot interferometers. FIG. 2 shows the variations in the light intensity I as a function of the order of interference p. It is possible to see in the drawing three intensity peaks $P_{k-1}$, $P_k$, $P_{k+1}$ at the centre of which the intensity is at a maximum Io corresponding to successive whole values $k-1$, k, $k+1$ of p. The width of each peak dp, corresponding to an intensity reduction. Io/2 is dependent on the reflection coefficient R:

$$dp = \frac{1-R}{\pi \sqrt{R}}.$$

The contrast of the interference system; $Io/I_m$ is also dependent on R:

$$\frac{I_o}{I_m} = \frac{4R}{(1+R)^2}.$$

Thus, for R=50% we have dp≈0.25 and $I_o/I_m$≈9; for R=90%, dp≈1/30 and $I_o/I_m$≈400; for R=98%, dp≈1/150 and $I_m$ is substantially negligible compared with $I_o$.

Figure 3:
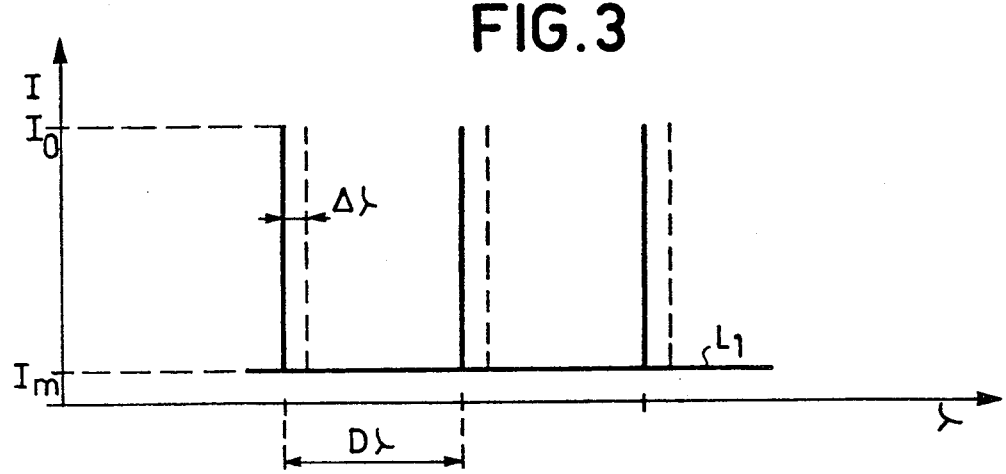

On the basis of FIG. 2 it is possible to obtain curves of variations of light intensity I as a function of wavelength λ for different values of the optical path L. FIG. 3 shows in unbroken lines the curve $C_1$ corresponding to a given value of L and in broken lines the curve $C_2$ corresponding to a value L+ΔL. The free spectral gap Dλ equal to the wavelength variation between two successive peaks is equal to λ/p. The order of interference p increases with the optical path L, whilst the spectral gap decreases. The invention makes it possible on the one hand to use very large values of L and on the other to obtain large relative variations ΔL/L by means which will be described hereinafter. These relative variations determine the relative wavelength variations of the peaks:

$$\Delta\lambda/\lambda = \Delta L/L$$

for each order.

For information purposes with an optical fibre of index n=1.5 about an average wavelength =1 μm, we obtain for L=1C cm p=3.10⁵ and D=1.8·10⁻³ nm, and for l=100 m, p=3.10⁸ and D=1.8·10⁻⁶ nm. The width of peak dp, i.e. the resolution d also decreases when the fibre length increases. For a reflection coefficient L=95%, d=3.10⁻⁵ nm for l=10 cm; and d=3.10⁸ nm for l=100 m.

Although it would appear that the selectivity of the interferometer improves with increasing length of the fiber used, another factor is involved which limits the possible length values. This factor is the absorption losses which are proportional to the fiber length. Thus, an optical fiber is characterized by its linear absorption coefficient, which varies with the wavelength of the propagated radiation. The known production methods for fibers make it possible to reach very low values of the linear coefficient for a given wavelength. This coefficient is increased on moving away from said wavelength. Typically is accepted that an absorption loss for an outward and return travel in the fiber of up to 0.5 dB can be accepted. Beyond this value there is a large reduction in the contrast. For example a fiber with a loss equal to 2 dB/nm for a wavelength of 850 nm can have a loss of approximately 30 to 50 dB/nm for a wavelength of 500 nm and approximately 100 dB/nm at about 450 nm. If this fiber is to be used in a typical range of 450–900 nm for e.g. a spectrographic application, its length must not exceed 1 m, which gives a loss of 0.5 dB for an outward and return travel and for 450 nm. However, if this fiber is to be used in a narrow range about the absorption minima of optical fibers (e.g. 350 nm, 1.3 μm, 1.55 μm, for a silica fiber), e.g. for a filtering application it is possible to use a much greater length. The wavelengths corresponding to the absorption minima are dependent on the composition of the fiber. For each application a compromise must be made between the operating wavelength range, the tolerated absorption defining the minimum contrast, the resolution and the spectral gap.

Different means can be used for reflecting the light waves at each end of the fiber. A first means is constituted by depositing appropriate layers on the ends which have been previously polished in such a way as to form planar faces perpendicular to the fiber axis. The known materials for this type of application include the dielectric materials $MgF_2$, $TiO_2$, $SiO_2$. Deposition can be in the form of a single layer, but it is usually formed by superimposing layers, whose thickness and refractive index are calculated as a function of wavelengths which are to be propagated and the refractive index of the fiber. It is then possible to determine the reflection coefficient R and absorption coefficient A as a function of the wavelength. To obtain maximum energetic efficiency it is preferable that the absorption layer is as low as possible. In the case of applications for which the spectrum of the wavelengths of radiation E is narrow, it is possible to determine the compositions of layers optimizing the energetic efficiency between radiations E and S. However, when the spectrum of the wavelengths of the radiation is wide, it may be preferable to use broad band layers, i.e. for which the reflection and absorption coefficients vary little as a function of the wavelengths. The absorption of the dielectric layers is added to the absorption in the fiber and must be taken into consideration in the compromise between the band widths and the absorption coefficient. A correction may be made necessary for compensating the energetic efficiency variations with the wavelength. This correction can be carried out by electronic means connected to the output of photodetector 3. A variant of this type of reflector is constituted by metallic layers, which are very simple to deposit, but which have a greater absorption than dielectric layers and cannot be optimized.

Another type of reflector can be constituted by discontinuity at the ends of the fiber. A simple manner obtaining this consists of directly joining to the two polished ends respectively the light source 2 formed, for example, by an AsGa laser and the photodetector 3 formed, for example, by a silicon photodiode. The difference in the nature between the materials constituting the fiber, e.g. glass and the gallium arsenide or silicon brings about a gap and a reflection of part of the light energy. The reflection coefficient is not optimized, but may be sufficient for certain applications, and there is no absorption. The discontinuity may also occur in the dimensions of the fiber, it being possible to produce significant reflection by a sudden thickness reduction in the vicinity of the ends of the fiber. It is also possible to create index gratings at the ends or even a grating distributed over the entire length of the fiber forming a distributed resonator. Such a grating can be obtained by winding the fibre round a grooved mandrel. When winding takes place in such a way that the fiber is taut, periodic or cyclic grooves extending over the entire length of the cylindrical mandrel create stresses which vary periodically or cyclically over the entire fiber length. The pitch of the gratings and its length determine the wavelength of the reflection peak and its width.

Among the physical phenomena able to vary the optical path, it is possible to use the elasto-optical effect. An embodiment of the invention illustrating this use is shown in FIG. 4. Fiber 1 is wound around a cylindrical tube 7 made from a piezoelectric ceramic material. Stresses can be created in the ceramic material by means of a voltage V supplied by a voltage generator 8 connected to two electrodes respectively deposited on the inner and outer faces of the cylinder. It can be ensured that only external diameter of the tube varies by filling the interior 9 with a non-compressible plastics material. The expansion of the ceramic material causes variations in the length and index of the wound fiber, which has the effect of varying the optical path L. In the case of a voltage V of a few volts it is possible to scan several orders of the interferometer, i.e. obtain a variation of L which is several times the wavelength. The radiation E from a light source 2 (e.g. a diode laser) is focused in the fiber by conventional means such as a lens 6 serving to introduce the maximum energy into the fiber. Photodiode 3, which collects the radiation S after focusing by lens 10 supplies an electrical signal $V_S$ constituted by pulses corresponding to the resonance peaks. An alternating voltage V is used for scanning purposes. In order to obtain a linear response it may be necessary to prestress the fiber by taut winding thereof or to superimpose a d.c. voltage on the a.c. control voltage. The scanning frequency can be much higher than that of a conventional Fabry-Perot interferometer. It is advantageously possible to choose a frequency value close to the resonating frequency of the ceramic material, which is typically approximately 200 kHz. However, it is necessary to take account of a frequency limitation in the case of very long fibers, due to the propagation time of the radiation in the fiber. In order to have "stable" operating conditions in the fiber, it is preferable for the scanning period or cycle to significantly exceed the duration of about 10 outward and return passages in the fiber. Typically the duration of an outward and return passage of a radiation of wavelength 1 $\mu$m is 0.5 $\mu$s for a 50 m fiber. Thus, it is preferable that the scanning period significantly exceeds 5 $\mu$s, corresponding to the frequency 200 kHz. If a longer fiber is used, the frequency must be even lower. However, in the case of a fiber with a length of a few dozen centimeters, a frequency of 200 kHz or even higher can be envisaged without any disadvantage resulting from this.

The winding of the fiber makes it possible to have a considerable length, but reduce overall dimensions. However, the mandrel diameter must be significant to prevent light energy losses by radiating and increase the apparent losses of the fiber. It can typically be a few centimeters. With certain fiber types it is possible to use diameters down to 2 mm without significant losses occurring. To obtain a compact device and guarantee the relative positioning of the various components, the fiber ends can be placed in terminal mountings 11 and 12, embedded in a rigid plate 13, e.g. of glass. The positioning of the optical elements 2, 3, 6, 10 takes place with respect to plate 13.

The device shown in FIG. 4 permits numerous constructional variants, particularly with regard to the way in which the stresses are created. By winding the fiber on to a cylindrical tube made from a compressible material, it is possible to produce stresses by circulating a pressurized fluid within the tube. It is also possible to use as the control means a magnetic field, which acts on a mandrel made from magnetostrictive material. Stresses can also be obtained by inclining a tensile force exerted on the mandrel. Optical path variations can also be obtained by winding the fiber on to a flat coil and by immersing it in an ultrasonic cell in such a way that all the turns from one and the same predetermined angle with the propagation direction of the ultrasonic waves. The frequency of these waves must be selected in such a way that the period or cycle is well above the transit time in the fiber.

Physical effects other than the elasto-optical effect are able to produce variations in the optical path. A particularly interesting effect is the magneto-optical effect, whose use is illustrated by FIG. 5. The device shown in FIG. 5 is very similar to that of FIG. 4. Fibre 1 is wound on to a cylindrical tube 7 made from a non-compressible material, e.g. silica. A rotational magnetic field $\vec{H}$ is created by means of a conductor 14 traversed by a current i from a current source 15. The magnetic field $\vec{H}$ at any point of the fiber is parallel to the light propagation direction and consequently causes variations in the refractive index by the Faraday effect. These variations are of the same sign for both propagation directions.

The Applications of the invention are the same as these of conventional Fabry-Pérot interferometers with an optical resonator, particularly in spectrometry. The interferometer can be used as a monochromator, associated with a wide spectrum. In order to improve the filtering properties it is possible to have two interferometers in series. This can be brought about in simple manner by using a single wound fiber provided with reflectors at both its ends and in a third intermediate area in the form, for example, of a fiber size reduction. By appropriately choosing the length of the two thus formed fiber portions, it is possible to ensure different spectral gaps between peaks. Interference peaks are only obtained in the case of coincidence between a peak of each portion. Thus, the resulting spectral gap is increased, whilst retaining a selectivity of the same order as that of each of the sections or portions considered separately.

The very high sensitivity of the interferometer according to the invention, even for low excitations, also makes it possible to envisage its use in measuring a physical parameter able to modify the optical path. Thus, it is possible to use such an interferometer for measuring pressures being exerted on the mandrel about which the fiber is wound, for example the pressure of a fluid circulating within the mandrel. This requires an appropriate calibration. In addition, it must be ensured that other causes of variations in the optical path are not superimposed on the effect to be measured. The device is particularly sensitive to temperature variations. To obviate this disadvantage it can be placed in a thermostatically controlled enclosure or a thermal probe can be associated therewith, which is inserted into a loop so as to superimpose on the stress caused by the pressure to be measured a stress which compensates the temperature variations, obtained for example by a voltage, the mandrel being piezoelectric.

What is claimed is:

1. A tunable optical resonator comprising:
   the combination of two partially reflecting and transmitting means and an optical monomode fiber positioned between said partially reflecting and transmitting means; and
   means for varying the optical length of said resonator wherein said monomode fiber is wound on a cylindrical mandrel made of a piezoelectric material and electrodes are formed at the inner and outer surface of said mandrel and connected to a voltage source and wherein said mandrel is filled with an essentially incompressible material and wherein means are disposed to strain said mandrel in order to vary the optical length of said resonator.

2. A tunable optical resonator as claimed in claim 1 wherein said partially reflecting and transmitting means are coatings of dielectric or metallic layers on at least a part of the ends of said fiber.

3. A tunable resonator as claimed in claim 1, wherein said partially reflecting and transmitting means are gratings formed on said fiber near the ends of said fiber.

4. A tunable optical resonator as claimed in claim 1, wherein said partially reflecting and transmitting means are discontinuities created in the vicinity of the ends of said fiber.

5. A monochromator comprising an optical source and at least two coupled optical resonators as claimed in claim 1, wherein the optical length of each of said resonators is adjusted to transmit one spectral band.

6. A high-sensitivity Fabray-Perot interferometer, having a tunable optical resonator, said interferometer comprising:
   a coherent light source;
   an optical detector;
   an optical resonator, including a monomode optical fiber and two partially reflecting means, each of said partially reflecting means being at opposite ends of said fiber, whereby light from said light source is reflected within said resonator and detected by said detector upon leaving said resonator; and
   means for tuning the wavelength of said resonator, including a cylindrical mandrel means made of piezoelectric materials and filled with an essentially incompressible material, about which said optical fiber is wound, said mandrel having electrodes formed on the inner and outer surfaces thereof, said means for tuning further including a variable voltage source connected to said electrodes for applying a voltage to said piezoelectric material, wherein a stress occurs in said mandrel causing a variation in the optical wavelength of said resonator.

* * * * *